Sept. 15, 1970  C. E. COOPER  3,528,629
STATIC DISCHARGERS FOR AIRCRAFT
Filed Dec. 4, 1967
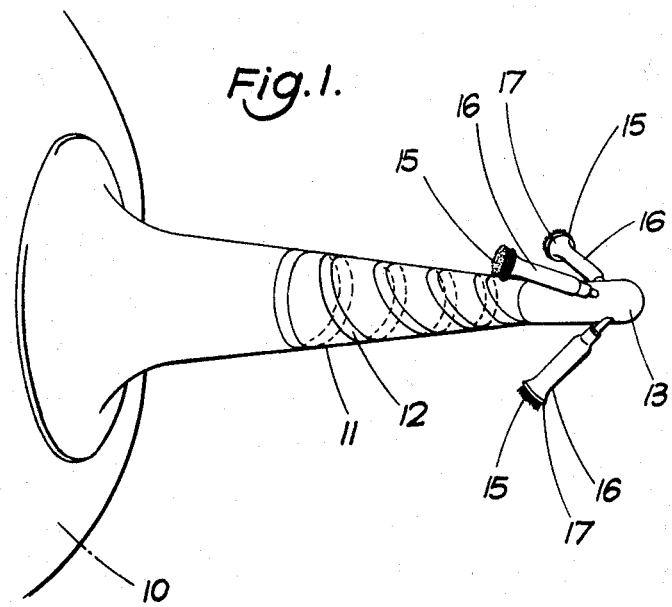
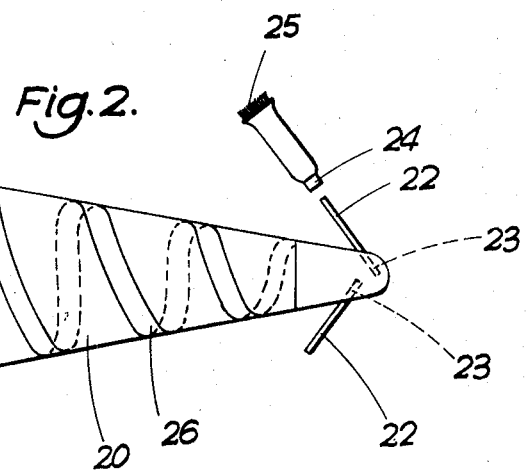
INVENTOR
Charles Edward Cooper
BY
Watson, Cole, Grindle + Watson
ATTORNEY United States Patent Office 3,528,629
Patented Sept. 15, 1970

3,528,629
STATIC DISCHARGERS FOR AIRCRAFT
Charles Edward Cooper, Shannon, Cookham Dean,
Berkshire, England
Filed Dec. 4, 1967, Ser. No. 687,682
Claims priority, application Great Britain, Dec. 7, 1966,
54,733/66
Int. Cl. B64d 45/02
U.S. Cl. 244—1    8 Claims

ABSTRACT OF THE DISCLOSURE

In an aircraft, a static discharger is mounted on the nose or a forwardly facing surface, e.g. the leading edge of a vertical tail surface, the discharger consisting of a rigid insulating support with an electrically resistive path connecting the aircraft structure to discharger points located forwardly of the aircraft structure.

---

This invention relates to static dischargers for aircraft.

Heretofore static dischargers have been designed to mount on the trailing edges or aircraft wings and the like on the assumption that these edges, being a small radius of curvature, are the points of highest potential gradient. Such dischargers have the object essentially of getting rid of a charge acquired by ice particles or the like and causing tribo-electric charge to accumulate on the aircraft.

According to this invention, in an aircraft, a static discharger is mounted on the nose or other forwardly facing part of the aircraft, the static discharger having discharge points connected by a resistive path to the electrically conductive body structure of the aircraft, the discharge points being located forwardly of the conductive part of the aircraft structure on which the discharger is mounted. In some high speed aircraft it is now the practice to provide a lightning diversion arrangement on the nose or other forwardly extending part of the aircraft and in this case the discharger is preferably mounted on such lightning diversion device.

As mentioned above, it has heretofore been the practice to mount static discharges on trailing edges of wings and other surfaces where there is a small radius of curvature. If there is horizontal voltage gradient in the air when the aircraft is in level flight or vertical voltage gradient when the aircraft is in a steep climb or descent, this gradient may be greatest at the nose of the aircraft even if the nose is of large radius of curvature. Because of this, discharges may take place at the nose of the aircraft whenever the potential gradient is sufficient to permit a discharge through the air. By providing a static discharger on the nose of the aircraft, such discharge can occur wholly or mainly through the discharger in a manner which causes much less interference with radio and other electronic equipment in the aircraft.

It is well known that the discharge points of a discharger should be as fine as possible in order to reduce the ionisation potential and hence to minimize the interference with radio equipment. For this purpose very fine metal wires are most conveniently employed and these cannot be sufficiently rigid to remain extending forwardly on a nose of a high-speed aircraft. Preferably therefore the discharger comprises a rigid member constituting or carrying a high resistive path and adapted for mounting on an aircraft to extend forwardly therefrom, which member at or near its forward end carries one or more groups of discharge points mounted so that they extend outwardly and rearwardly from the rigid member and are electrically connected to said resistor path. Conveniently a number of groups of discharge points are spaced evenly around the front end of the rigid member. Each group of discharge points may be located within a support member forming a shroud around the group, the points extending from the open end of the shroud, this open end facing outwardly and rearwardly with respect to the direction of movement of the aircraft. Preferably this open end is flared outwardly to form a bell-shaped mouth or otherwise shaped so as to maintain a region of low pressure in the neighbourhood of discharge points and thereby also prevent bunching of the discharge wires under pressure of the air flow. In a region of lower pressure the discharge can take place at a lower potential.

The invention also includes within its scope a discharger comprising a rigid elongated member constituting or carrying an electrically resistive path, and a number of groups of discharge wires, each group being surrounded by a shroud and mounted on or near one end of said member with the wires electrically connected to said resistive path, the ends of the wires forming discharge points extending outwardly from said shroud in a direction from said one end towards the other end of said member.

The following is a description of one embodiment of the invention, reference being made to the accompanying drawings in which:

FIG. 1 shows a static discharger mounted to extend forwardly from the surface of a radome on the nose of an aircraft; and FIG. 2 illustrates a construction of discharger which is slightly different from that of FIG. 1.

Referring to FIG. 1, a radome surface is indicated generally at 10. In accordance with conventional practice, from the nose of the radome one or more metal conductors (not shown) would extend to the metal structure of the aircraft to act as lightning conductors. The static discharger is mounted so that the resistive path which is necessary through the discharger is electrically connected through the lightning conductor or conductors. In the particular embodiment illustrated, the static discharger has a conically shaped body 11 formed of electrically insulating material. A resistive path is formed over part of the length of the cone as a helical track 12 constituted by conductive material, for example graphite, having a suitable electric resistance. The conductive coating is covered with a protective layer, for example a coating of epoxy varnish. One end of the helical resistive track is electrically connected inside the discharger structure to the aforementioned lightning conductor in the radome. The other end of the helical resistive track is connected via a resistive coating on a cylindrical termination 13 at the forward end of the discharger to three groups of metal discharge points 15. These discharge points are formed of very fine nickel chromium alloy wires bunched together to form a multi strand discharger. Typically the wires would have a diameter of less than 0.001 inch and each group would contain some hundreds of wires. Each group of discharge wires is secured with a covering shroud 16, typically of polyethylene, which is securely attached to the nose portion of discharger so that the discharge points point outwardly and rearwardly from the nose of the discharger. Each shroud 16, as shown in the drawing, has a bell shaped mouth 17 to produce a region of low pressure around the discharge points thereby enabling the discharge to take place at a lower potential than would otherwise by the case.

The manner of construction of such a discharger is illustrated in FIG. 2 which shows a discharger generally similar to that of FIG. 1 although differing in detail. In FIG. 2 a conical body 20 made of glass fibre reinforced dielectric material or other reinforced dielectric material has, at its larger diameter end, a metal member 21 which screws onto or into the airframe structure or radome lightning diverter probe. Three or four rods 22 of resin bonded glass fibre material are inserted into angled holes 23 at the smaller end of the support. These rods, which typically are 1/16" diameter, are fixed in place with a resinous adhesive and covered overall with a thick hard deposit of graphite to form a conducting junction between a metal tube 24 holding the discharge wires 25 and thinner graphite layer forming the high resistance path. The tip assemblies are similar to those of FIGURE 1 and are attached with a conducting adhesive. The high resistance path of the conical structure 20 is formed by a helical band 26 of graphite. A thick deposit of hard graphite connects this band to the member 21.

It will be noted that the discharge points are situated well forwardly of the electrically conductive part of the structure and hence, if there is any steep voltage gradient through which the aircraft is passing, discharge will take place at the points. Because of the multitude of fine points this discharge can take place at a low potential thereby causing the minimum of interference with radio or other electronic equipment on the aircraft. It will be noted also that this discharger constitutes in effect a lightning diversion arrangement enabling the discharge to take place at a low potential rather than producing high potential discharges onto the nose of the aircraft. Such a discharger may be mounted not only on the nose of the aircraft but at any other point where high potential discharges may arise due to the voltage gradient in the air, for example, on Pitot heads or other sensors which have to extend forwardly from the general body of the aircraft. This discharger, may be mounted on or near the forward tip of the rigid tubular structure which projects forward from the fin cap of cetain aircraft, to function as an aerial. As another example, the discharger may be mounted on the leading edge of a vertical tail surface of an aircraft; on many aircraft, radio aerials are mounted on or in such vertical tail surfaces and it is desirable to minimize interference from static discharges in this region.

I claim:
1. In an aircraft, a static discharger for dissipating static charges on the electrically conductive body structure of the aircraft, said discharger is mounted on a forwardly facing part of the aircraft and including a plurality of small discharge points located forwardly of said electrically conductive body, and means constituting an electrically resistive path connecting the discharge points to said electrically conductive body structure to provide a path for charges on the body structure to the discharge points, whereby said charges are dissipated in the atmospheric electric field forward of the aircraft structure.

2. A static discharger for mounting on a forwardly facing part of an aircraft comprising a rigid member constituting a high resistive path and adapted for mounting on the aircraft to extend forwardly therefrom, which member at or near its forward end carries at least one group of discharge points mounted so that the points extend outwardly and rearwardly from the rigid member and are electrically connected to said resistive path.

3. A static discharger as claimed in claim 2 wherein a number of groups of discharge points are spaced evenly around the front end of the rigid member.

4. A static discharger as claimed in claim 2 wherein there is provided a support member within which the group of discharge points is located, said support member forming a shroud around the group with one open end, the points extending from the open end of the shroud, this open end facing outwardly and rearwardly with respect to the direction of movement of the aircraft.

5. A static discharger as claimed in claim 4 wherein the open end of the shroud is flared outwardly to form a bell-shaped mouth so as to maintain a region of low pressure in the neighbourhood of the discharge points and thereby prevent bunching of the discharge wires under pressure of the air flow.

6. A static discharger as claimed in claim 2 wherein said rigid member comprises an electrically insulating element with a coating constituting said resistive path.

7. A static discharger comprising a rigid elongated member constituting an electrical resistive path, a number of groups of discharge wires, and a shroud surrounding each group, each group being mounted near one end of said member with the wires electrically connected to said resistive path, the ends of the wires forming discharge points extending outwardly from said shroud in a direction from said one end towards the other end of said member, means for mounting said member on an aircraft with said resistive path electrically connected to said mounted means.

8. A static discharger as claimed in claim 7 wherein the resistive path is formed by a helical coating around an insulating support member.

References Cited

UNITED STATES PATENTS

| | | | |
|---|---|---|---|
| 2,243,618 | 5/1941 | Brown | 244—1 X |
| 2,583,540 | 1/1952 | Bennett | 317—2 X |
| 3,034,020 | 5/1962 | Benkozy | 244—1 X |

DUANE A. REGER, Primary Examiner

JEFFREY L. FORMAN, Assistant Examiner

U.S. Cl. X.R.

317—2